United States Patent [19]
Johnson et al.

[11] 4,418,650
[45] Dec. 6, 1983

[54] FLUIDIZED BED HEAT EXCHANGER HAVING AN INSULATED FLUID COOLED AIR DISTRIBUTOR PLATE ASSEMBLY

[75] Inventors: Richard C. Johnson, Dansville, N.Y.; Venkatraman Seshamani, Gillette, N.J.; Leigh B. Egbert, Dansville, N.Y.

[73] Assignee: Foster Wheeler Energy Corporation, Livingston, N.J.

[21] Appl. No.: 420,445

[22] Filed: Sep. 20, 1982

[51] Int. Cl.³ .................. F22B 1/00; F28D 13/00
[52] U.S. Cl. .................. 122/4 D; 432/58; 110/245; 165/104.16; 34/57 A
[58] Field of Search .................. 122/4 D; 432/58; 165/104.16; 110/245; 34/57 A; 126/447

[56] References Cited

U.S. PATENT DOCUMENTS

| | | | |
|---|---|---|---|
| 3,952,725 | 4/1976 | Edmondson | 126/447 |
| 3,983,927 | 10/1976 | Steever et al. | 122/4 D |
| 3,985,117 | 10/1976 | Sollen | 126/447 |
| 4,290,387 | 9/1981 | De Feo et al. | 122/4 D |
| 4,312,135 | 1/1982 | Devanney | 122/4 D |
| 4,312,302 | 1/1982 | Kollerap | 122/4 D |
| 4,338,921 | 7/1982 | Harder et al. | 126/447 |

Primary Examiner—Henry C. Yuen
Attorney, Agent, or Firm—Marvin A. Naigur; John E. Wilson; Warren B. Kice

[57] ABSTRACT

A fluidized bed heat exchanger in which an air distributor plate assembly is disposed within an enclosure for supporting a bed of particulate material. The plate assembly includes a plurality of horizontal, spaced tubes through which water is passed to cool the assembly. Air is passed from an air plenum through openings formed in the plate assembly to fluidize the particulate material. Insulation is disposed on the lower surface of the plate assembly to insulate the latter from the heat of the fluidizing air, and the upper surface of the plate assembly is insulated from the high temperatures occurring in the bed.

15 Claims, 3 Drawing Figures

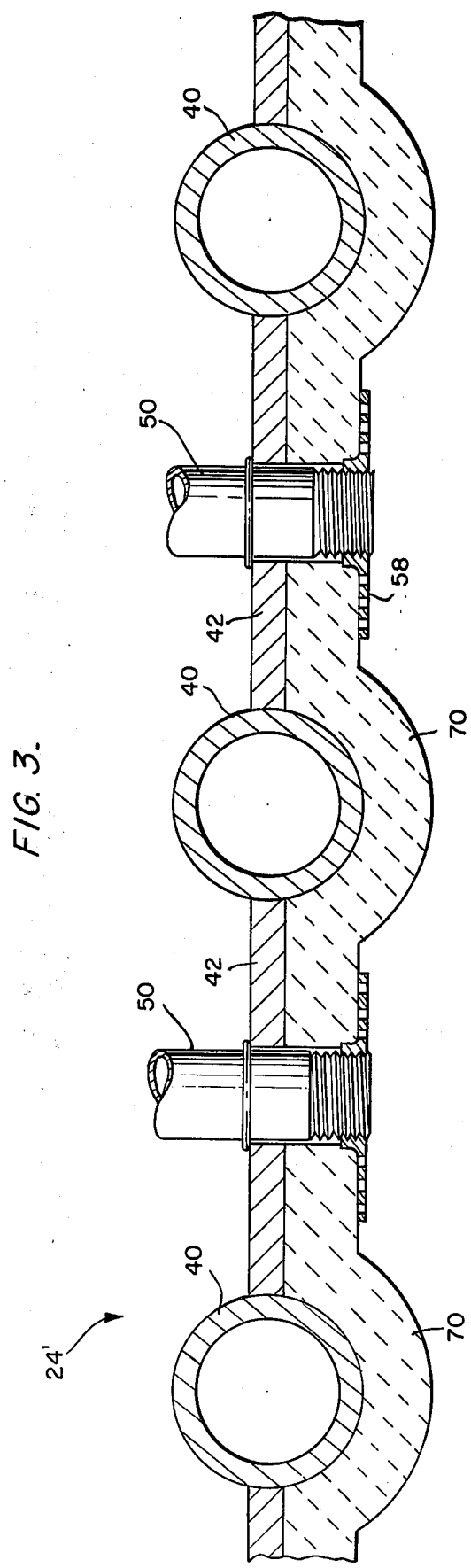

FLUIDIZED BED HEAT EXCHANGER HAVING AN INSULATED FLUID COOLED AIR DISTRIBUTOR PLATE ASSEMBLY

BACKGROUND OF THE INVENTION

This invention relates to a fluidized bed heat exchanger and, more particularly, to such a heat exchanger having a fluid-cooled, air distribution plate assembly for supporting fluidizable particulate material which is insulated from the surrounding heat.

The use of fluidized beds has long been recognized as an attractive way of generating heat. In a typical fluidized bed arrangement, air is passed through a perforated plate, or the like, which supports a bed of particulate material, usually including a mixture of inert material, a fuel material such as high sulfur bituminous coal, and an adsorbent material for the sulfur released as a result of the combustion of the fuel material. As a result of the air passing through the bed, the bed behaves like a boiling liquid which promotes the combustion of the fuel. The basic advantages of such an arrangement include a relatively high heat transfer rate, substantially uniform bed temperature, combustion at relatively low temperatures, ease of handling the fuel materials, a reduction in corrosion and boiler fouling and a reduction in boiler size.

In the fluidized bed combustion process, in order to insure capture by the adsorbent of the sulfur released during combustion of the fuel, the bed temperature has to be maintained at a relatively high value (normally 1500°–1550° F.). This requires the bed-supporting plate to be constructed of an expensive material, such as stainless steel, which will withstand these temperatures. However, even when these type of materials are used, the large differential expansion involved and the thermal gradients occurring across the surface of the plate reduce the life of the plate considerably. As a result, the plate has to be frequently replaced, which is costly both from a material and a labor standpoint, and which results in a considerable amount of down-time. Also, in fluidized bed heat exchangers, using water-cooled walls, the difference in temperatures between the walls and the bed-supporting plate result in border seal junction problems.

According to U.S. patent application Ser. No. 138,807, filed Apr. 9, 1980, by Robert D. Stewart, and assigned to the present assignee, now abandoned, a plurality of air distributors extend perpendicular to the perforated plate assembly and register with the openings in the latter assembly for receiving and discharging air in an upward direction to fluidize the particulate material. The lengths of the air distributors are such that the upper surface of the plate assembly is insulated from the high temperatures occurring in the bed. Also, the plate assembly is formed by a plurality of tubes through which water is passed to provide further cooling. This enables the components forming the plate assembly to be fabricated at a relatively low cost, low alloy material and yet enjoy a relatively long life when compared to plates of more expensive heat-resistant material that are not so insulated and cooled.

However, it was found that the lower surface of the plate assembly and, more particularly, the lower surfaces of the tubes and fins forming the plate assembly were also subjected to a relatively high, and potentially damaging temperature by virtue of being exposed to the preheated fluidizing air passing from the air plenum through the plate assembly.

SUMMARY OF THE INVENTION

It is therefore an object of the present invention to provide a fluidized bed heat exchanger in which a bed-supporting plate assembly is provided which can be fabricated from a low alloy material and yet enjoys an increased life when compared to plates of similar prior art arrangements.

It is a further object of the present invention to provide a fluidized bed heat exchanger of the above type in which the bed-supporting plate assembly is formed by a plurality of tubes through which a cooling fluid is passed to lower the temperature of the plate assembly.

It is a further object of the present invention to provide a fluidized bed heat exchanger of the above type which has an air distribution system that insulates the upper surface of the bed-supporting plate assembly from the high operating temperatures of the bed.

It is a still further object of the present invention to provide a fluidized bed heat exchanger of the above type in which the lower surface of the plate assembly is also insulated from the relatively high temperature air passing through the plate assembly.

It is a still further object of the present invention to provide a fluidized bed heat exchanger of the above type in which insulation materials are provided along the lower surface of the plate assembly to effect the aforementioned insulating function.

Toward the fulfillment of these and other objects, the system of the present invention comprises a plate assembly adapted to support a bed of particulate material and formed by a plurality of tubes through which a cooling fluid is passed. The tubes are connected by elongated fins having a plurality of openings extending therethrough for receiving air and discharging the air in an upward direction into the bed to fluidize the bed material. The lower surface of the plate assembly is insulated from the heat of the fluidizing air by a fiberboard, either alone or in combination with a ceramic blanket. The particulate material is maintained in a dormant state immediately above the plate assembly to insulate the latter from the heat in the bed.

DESCRIPTION OF THE DRAWINGS

The above brief description, as well as further objects, features, and advantages, of the present invention will be more fully appreciated by reference to the following detailed description of the presently preferred but nonetheless illustrative embodiment in accordance with the present invention, when taken in connection with the accompanying drawings in which:

FIG. 3 is a view similar to FIG. 2, but depicting an alternative embodiment of the plate assembly utilized in the heat exchanger of FIG. 1.

DESCRIPTION OF THE PREFERRED EMBODIMENTS

Figure 1:
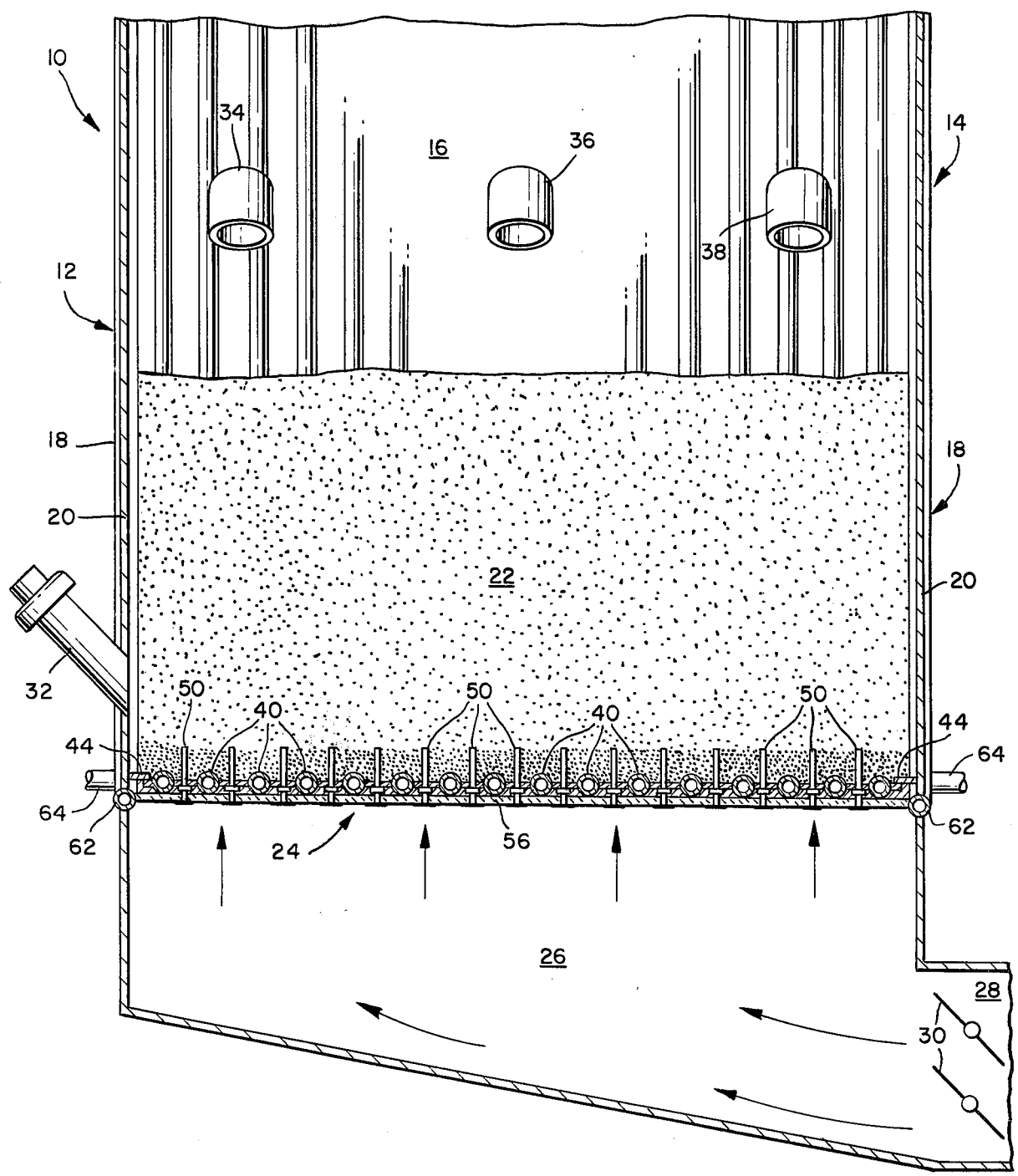
FIG. 1 is a vertical sectional view of the fluidized bed heat exchanger of the present invention.

Referring to FIG. 1 of the drawings, the reference numeral 10 refers in general to an enclosure forming a major portion of a fluidized bed heat exchanger, or reactor, which may be in the form of a boiler, combustor, or any similar type device. The enclosure 10 consists of a front wall 12, a rear wall 14, and two sidewalls, one of which is shown by the reference numeral 16. Each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes 18, in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22, is disposed within the enclosure 10 and rests on a plate assembly 24 extending horizontally in the lower portion of the enclosure. The bed 22 can consist of a mixture of discrete particles of inert material, fuel material, such as bituminous coal, and an adsorbent for the sulfur released by the combustion of the fuel material.

An air plenum chamber 26 is provided immediately below the plate assembly 24 and an air inlet 28 is provided through a lower extension of the rear wall 14 in communication with the chamber 26 for distributing preheated air from an external source (not shown) to the chamber. A pair of air dampers 30 are suitably mounted in the inlet 28 for pivotal movement about their centers in response to actuation of external controls (not shown) to vary the effective opening in the inlet and thus control the flow of air into the chamber 26. Since the dampers 30 are of a conventional design, they will not be described in any further detail.

A bed light-off burner 32 is mounted through the front wall 12 immediately above the plate assembly 24 for initially lighting off the bed 22 during startup.

A plurality of overbed feeders 34, 36 and 38 are provided which extend through the side walls 16. The feeders 34, 36 and 38 receive relatively fine particulate coal from inlet ducts or the like (not shown), and are adapted to feed the particles onto the upper surface of the bed 22 in a conventional manner. It is understood that the feeders 34, 36 and 38 could be located at a level below the upper surface of the bed 22, and/or feeders identical to the feeders 34, 36 and 38 could be provided through one or more of the front walls 12, the rear walls 14 and the other side wall 16 for introducing the adsorbent to the bed.

Figure 2:
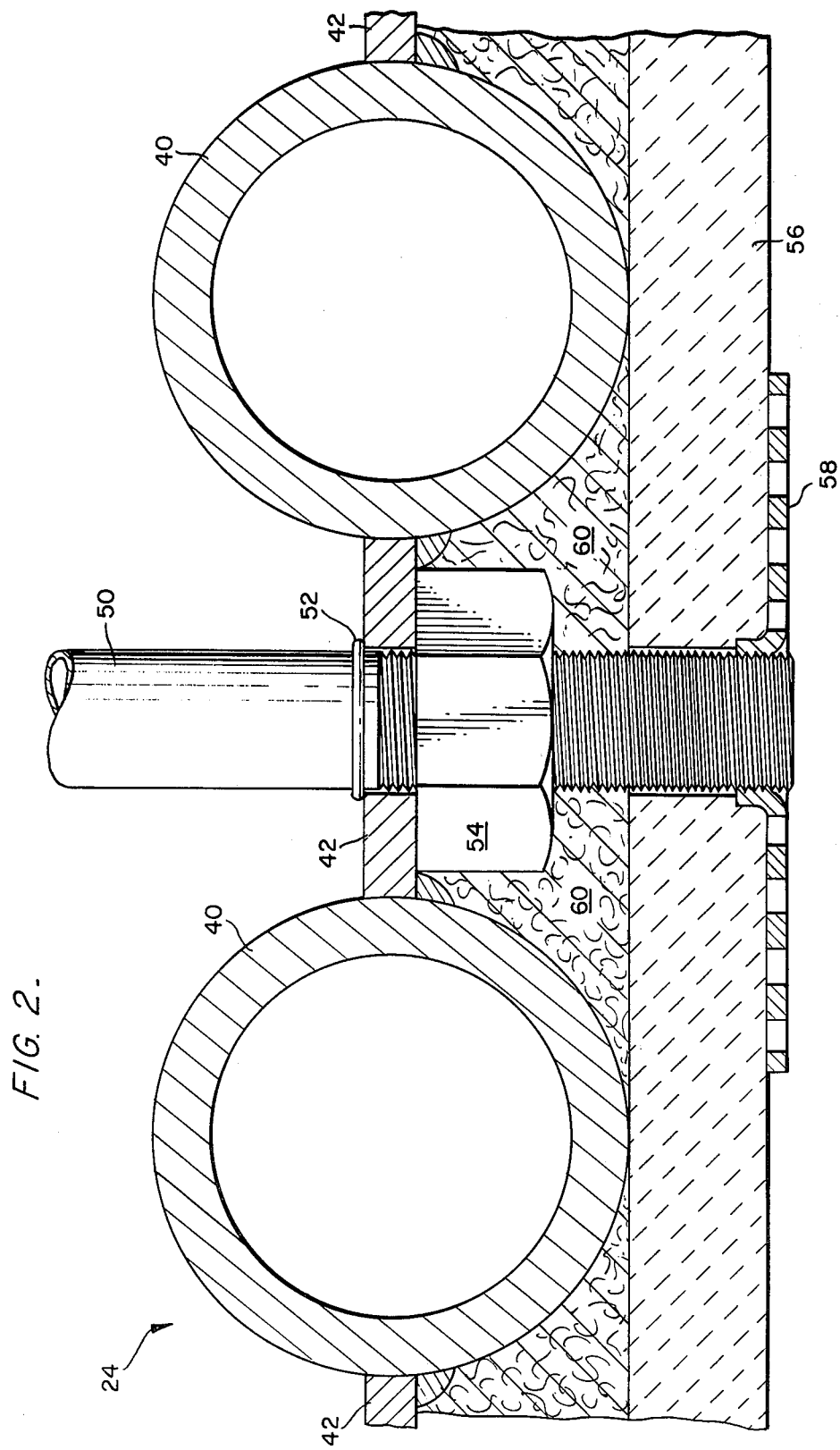
FIG. 2 is an enlarged partial sectional view of a portion of the insulated bed-supporting plate assembly of the heat exchanger.

The details of the plate assembly 24 are shown in FIG. 2. The assembly 24 consists of a plurality of spaced parallel tubes 40 extending horizontally between the walls 12, 14 and 16. The tubes 40 are connected together to form an integral structure by a plurality of plates, or fins, 42 extending for the entire length of the tubes 40 and connected to the tubes at diametrically opposite surfaces thereof.

As shown in FIG. 1, a plurality of horizontal support plates 44 extend from the fins 20 forming the front wall 12 and the rear wall 14 and are connected to the endmost fins 42 of the plate assembly 24, to support the plate assembly 24 in the position shown. The connections between the fins 42 and the tubes 40, between the endmost fins 42 and the support plates 44, and between the support plates 44 and the fins 20 can be made in any known manner such as by weldments, or by other known fabricating techniques, such as keying, rolling, braising, pinning, tacking, etc.

Referring again to FIG. 2, a plurality of air distributors, or nozzles, 50 extend through a plurality of spaced openings formed through the fins 42. The distributors 50 are in the form of vertically disposed tubular members that extend upwardly from the fins for a predetermined distance into the bed 22 of particulate material. The distributors 50 are spaced apart in the direction from front-to-rear as better shown in FIG. 1, it being understood that they are also spaced apart a predetermined distance from side-to-side so as to span the entire area enclosed by the walls 12, 14 and 16.

The lower ends of the distributors 50, as viewed in FIG. 2, project below the lower surface of the fins 42 and receive air from the air plenum 26. After passing through the length of the distributors 50, the air discharges outwardly into the fluidized bed at the predetermined distance from the plate assembly 24. As a result, a dormant layer of particulate material is formed between the upper surface of the plate assembly 24 and the upper ends of the distributor 50 for reasons that will be discussed in detail later.

The diameter of the aforementioned openings in the fins 42 are slightly larger than the outer diameter of the air distributors 50 and a circumferentially extending flange 52 is provided on the outer surface of each distributor to locate the distributor in its respective opening.

The lower portion of each distributor 50 is externally threaded and receives a lock nut 54 which can be tightened into engagement with the lower surface of the corresponding fin 42, to secure each distributor in the position shown.

A horizontally extending, insulating board 56, preferably of a fiber material, extends from the front wall 12 to the rear wall 14 (FIG. 1) and in a tangential relationship to the lower surface of the tubes 40, as viewed in FIG. 2. A plurality of openings are provided in the board 56 for receiving the lower end portions of the distributors 50 in a loose fit. Although not clear from the drawings, the board 56 can extend across the entire width of the enclosure 10, i.e., from one sidewall 16 to the other, or, alternatively, can be formed by a plurality of sections extending in the same manner.

The board 56 is secured in the position shown by a plurality of support caps 58 which are in threaded engagement with the lower end portions of the distributors 50, respectively, and which engage lower surface portions of the board in a supporting relationship.

A ceramic fiber blanket, shown in general by the reference numeral 60, extends in the spaces defined between the fins 42, the tubes 40, the distributors 50 and the board 56. The blanket 60 and the board 56 thus function to insulate the tubes 40, the fins 42 and the distributors 50 from the heat of the fluidizing air in the plenum 26, as will be described.

The blanket 60 can be formed of ceramic fiber or precut strips of ceramic fiber blanket of the type marketed by The Carborundum Company, under the trademark "Durafelt". The board 56 can be in the form of a ceramic fiberboard, such as The Carborundum Company's "Hotboard" or "Duraboard HD". The board surface may be coated with a colloidal silica compound, such as Carborundum Company's "Rigidizer" to impart a toughened surface layer which is resistant to high velocity gas erosion, and the support caps 58 may be made of perforated squares or circles of metal.

Referring again to FIG. 1, a pair of horizontal headers 62 are shown in FIG. 1 which are connected in fluid communication to the tubes 18 forming the front wall 12 and the rear wall 14, it being understood that similar headers are provided in communication with the upper ends of the walls and with both ends of the side walls 16. As a result, a fluid to be heated can be sequentially or simultaneously passed through the walls 12, 14 and 16 to pick up the heat from the fluidized bed in a conventional manner. A header 64 is provided adjacent each side wall 16 in communication with the corresponding ends of the tubes 40 of the plate assembly 24 to enable cooling fluid to be passed through these tubes. It is understood that the cooling fluid for the headers 48 can either be provided from the same source as the fluid passing through the walls 12, 14 and 16, or from a separate source.

In operation, the dampers 30 associated with the air inlet 28 are opened and heated air is distributed up through the chamber 26, towards the plate assembly 24 and into the inlet ends of the distributors 50, with the blanket 60 and the board 56 functioning to insulate the plate assembly from the heat of the air. The air then flows upwardly through the lengths of the distributors 50 before it discharges from their outlet ends into the bed 22 at a plane above the plane of the plate assembly. Thus, that portion of the particulate material in the bed 22 extending immediately above the outlet ends of the distributors 50 is fluidized while the portion extending between the latter ends and the upper surface of the plate assembly 24 remains dormant, or stagnant.

The light-off burner 32 is fired to heat the material in the bed until the temperature of the material reaches a predetermined level, at which time particulate fuel is discharged from the feeders 34, 36 and 38, and onto the upper surface of the bed 22 as needed to insure a continuous replenishing of the fuel material at it burns off.

After the bed 22 has been fluidized and has reached a predetermined elevated temperature in accordance with the foregoing, the light-off burner 32 is turned off while the feeders 34, 36 and 38 continue to distribute particulate fuel to the upper surface of the bed in accordance with predetermined feed rates. As a result of the foregoing, the dormant layer of particulate material extending between the upper surface of the plate assembly 24 and the outlet ends of the distributor 50 acts as an insulator for the plate 24. Spent fuel material, primarily in the form of ashes, can be discharged from an outlet (not shown) extending from the plate assembly 24 and through one of the walls 12, 14 or 16.

Cooling fluid, preferably water, is passed between the headers 64 and through the tubes 40 of the plate assembly 24 to reduce the temperatures of the latter assembly; and fluid to be heated is passed simultaneously, or in sequence from the headers 62 through the tubes 18 forming the walls 12, 14 and 16 to add heat from the fluidized bed to the fluid before it is passed to external apparatus for further processing.

As a result of the insulation of both the upper portions and the lower portions of the tubes 40, the fins 42 and the distributors 50, these components can be fabricated of a relatively low cost, low alloy material and yet will enjoy a relatively long life when compared to plates of more expensive, heat-resistant material that are not so insulated.

The embodiment of FIG. 3 includes components identical to those of the previous embodiment, which components are given the same reference numeral. According to the embodiment of FIG. 3, a plate assembly 24' is provided whose lower surface is insulated by a vacuum-formed insulating board 70 which is contoured in a pattern complementary to the shape of the lower surfaces of the tubes 40 and the fins 42. The board 70 is secured in an abutting relationship to the tubes 40 and fins 42 by means of the support caps 58 which threadedly engage the lower portions of the distributors 50 which, in turn, extend through corresponding openings formed in the board 70 in an identical manner to the previous embodiment. The board 70 can be fabricated from a material identical to the board 56 of the previous embodiment and, as in the previous embodiment, functions to insulate the plate assembly 24 from the heat of the fluidizing air, as discussed above.

According to both embodiments of the present invention, an insulation is provided on the exposed surfaces of the plate assemblies as discussed above, while not requiring any additional structural metal support, since it is suspended from the water tube grid plate structure. Also, it is lightweight and may be prefabricated to fit the specific diameter of the projecting portion of the air distributors 50.

It is understood that variations can be made in the foregoing without departing from the scope of the invention. For example, the air distributors can take any of the forms disclosed in the above-identified application. Also, in the embodiment of FIGS. 1 and 2, the support caps 58 may be of a larger size than shown so that they extend over and protect the entire lower surface of the board 56.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A fluidized bed heat exchanger comprising a plate assembly including a plurality of spaced parallel horizontal tubes, said plate assembly extending in a substantially horizontal plate to support a bed of particulate material, means for passing a cooling fluid through said tubes, a plurality of openings formed through said plate assembly, an air plenum located below said plate assembly for introducing heated air into said openings, said air passing through said openings to fluidize said particulate material, and means for insulating the lower surface of said plate assembly from the heat of said air.

2. The heat exchanger of claim 1 wherein an air distributor is disposed in each of said openings for receiving said air from said plenum and discharging said air into said bed of particulate material.

3. The heat exchanger of claim 2 wherein said plate assembly further includes a plurality of elongated fins extending between said tubes and connected thereto.

4. The heat exchanger of claim 3 wherein said openings extend through said fins.

5. The heat exchanger of claim 4 wherein an air distributor is disposed in each of said openings for receiving said air from said plenum and discharging said air into said bed of particulate material.

6. The heat exchanger of claim 2 wherein said insulating means comprises a fiberboard extending in an abutting relationship to said plate assembly and means for connecting said fiberboard to said air distributors.

7. The heat exchanger of claim 6 wherein said fiberboard extends tangentially to the lower surfaces of said tubes.

8. The heat exchanger of claim 7 wherein said insulating means further comprises a fiber blanket extending in the spaces defined between said fiberboard, said tubes, said fins, and said air distributors.

9. The heat exchanger of claim 2 wherein said fiberboard is contoured in a pattern complementary to the lower surfaces of said tubes and said fins and is disposed in an abutting relationship therewith.

10. The heat exchanger of claim 6 or 9 wherein a plurality of openings are formed through said fiberboard for receiving said air distributors.

11. The heat exchanger of claim 10 wherein said connecting means comprises at least one support cap in threaded engagement with the lower end portion of each air distributor and in an abutting relation with the lower surface of said fiberboard.

12. The heat exchanger of claim 2 or 4 wherein the outlet portions of said air distributors are located above said plate assembly so that the particulate material located between said plate assembly and said outlet portions remains in a dormant, non-fluidized state so as to insulate the upper surface of said plate assembly from the heat of said bed.

13. The heat exchanger of claim 12 wherein each distributor is in the form of a vertically extending tube extending perpendicular to said plate assembly and adapted to discharge air in an upward direction from its upper end.

14. The heat exchanger of claim 1 further comprising a plurality of upright walls surrounding said plate assembly to form a chamber for housing said particulate material.

15. The heat exchanger of claim 14 wherein said walls are formed by a plurality of upright tubes through which water is passed to pick up the heat from said bed.

* * * * *